July 24, 1934.  G. H. WALKER  1,967,692
EYE FOR ARTIFICIAL BAITS, LURES, TOYS, AND THE LIKE
Filed June 24, 1933
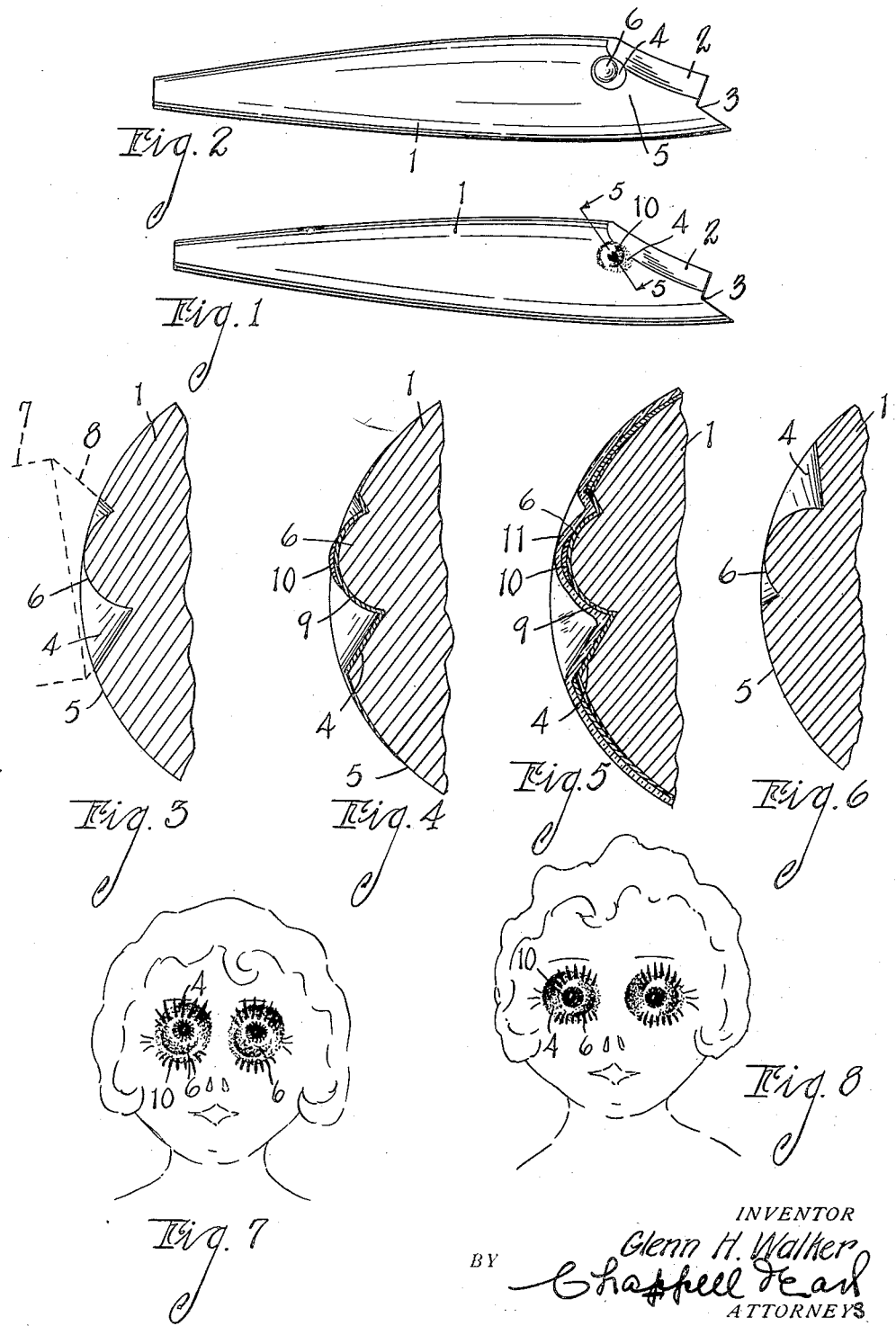
INVENTOR
Glenn H. Walker
BY Chappell Dean
ATTORNEYS Patented July 24, 1934

1,967,692

UNITED STATES PATENT OFFICE 1,967,692

EYE FOR ARTIFICIAL BAITS, LURES, TOYS, AND THE LIKE

Glen H. Walker, Kalamazoo, Mich., assignor to Shakespeare Company, Kalamazoo, Mich.

Application June 24, 1933, Serial No. 677,400

11 Claims. (Cl. 46—40)

The main object of this invention is to provide in an artificial toy, bait, lure or the like formed of wood, hard fiber or material that may be machined as wood, an artificial eye which is quite life-like in appearance, may be economically formed, and is very durable.

A further object is to provide a method of producing artificial eyes having these advantages which enables a wide variation in expression or effect of the eye and the effect of the gaze being directed as desired, also one which enables easy production of a ludicrous appearance in the object.

Objects pertaining to details and economies of my invention will definitely appear from the description to follow. The invention is defined in the claims.

An embodiment of my invention and certain steps in the method of making are illustrated in the accompanying drawing in which:

Fig. 1 is a side elevation of a fish bait or lure embodying my invention.

Fig. 2 is a side elevation illustrating a step in the manufacturing thereof.

Fig. 3 is an enlarged fragmentary section illustrating the method of manufacture.

Fig. 4 is a fragmentary section corresponding to that of Fig. 3 with the tool omitted showing another step in the method of manufacture.

Fig. 5 is an enlarged fragmentary section on line 5—5 of Fig. 1.

Fig. 6 is a fragmentary section corresponding to that of Fig. 3, the tool being omitted, illustrating means by which the eye or the expression thereof may be varied by employing the same tool.

Fig. 7 is a front elevation of the head of a toy embodying my invention.

Fig. 8 is a similar view of a toy head illustrating a variation in the positioning of the eye.

In Figs. 1 and 2 and in corresponding fragmentary sections thereof I illustrate my invention as embodied in an artificial fish bait or lure, and in Figs. 7 and 8 as embodied in a doll. The structure and method of making are the same in all embodiments, slight variations in position being for the purpose of showing the possible adaptations for obtaining different expressions.

The bait or lure 1 is of the wood or plug type consisting of a turned body having the front portion 2 thereof conformed to represent a mouth 3 and present a nose portion with inclined surfaces.

In carrying out my invention I form a conical socket 4 preferably in a curved surface as 5, this conical recess or socket representing an eye socket. At the bottom of this recess and on the same axis I form a spherically curved raised portion 6 which represents an eyeball. Such axis preferably intersects a normal to the curved surface in which the socket is formed at an angle.

The socket and eyeball are preferably formed by means of a rotary friction-pressure tool 7 having a conical tip 8 with a central spherically curved recess therein. In forming the recess and eyeball with such a tool there is no danger of splitting the wood or chipping the surface thereof, and the eyeball and socket have a polished smooth finish when the forming operation is completed. The tool I use practically burnishes the eye into the wood so that the ball of the eye is hard and very smooth. The angle at which the tool is presented to the surface determines the apparent angle of vision of the eye.

With the eye formed as illustrated in Figs. 2 and 3 a ground or sheeting coat is applied as indicated at 9. I have not attempted to illustrate any variations in this coating, which is shown much thicker in the drawing than it would be in practice for convenience in illustration. To this ground coating, which may be shaded to represent an iris as shown in Figs. 7 and 8, I apply a pupil 10, and over the whole I apply a transparent coating 11. This results in a very life-like attractive appearance.

The eyes may be very economically produced and are not easily injured, which is a very desirable characteristic, particularly in toys and baits which are subjected to rough usage.

In the manufacture of baits it has been quite common practice to insert beads, and also round-headed tacks, ornamenting the tacks to represent an eye, but these do not result in the life-like effect of eye socket and eyeball present in structures embodying my invention.

In Figs. 6, 7 and 8 I illustrate the method of producing varying expressions and this largely results from the manner in which the tool is presented to the surface, although this effect may be added to by the shading and coloring. Ludicrous effects are also possible by having one eye directed in one direction and the other in another direction, or the eyes may be crossed or variously presented as desired.

I have not attempted to illustrate various adaptations of my improvements but it will be understood that my invention may be readily embodied and is desirable for embodiment in toy animals as well as dolls, and, as stated, has the advantage of being very economical in practice, attractive in results, and is a very durable structure.

Having thus described my invention what I claim as new and desire to secure by Letters Patent is:

1. A toy, lure or the like of wood having a curved surface with a conical socket therein constituting an eye socket and with a spherically curved raised portion within the socket in the same axis and constituting an eyeball, said axis being at an angle to the normal of the said curved surface of the toy or lure, the central portion of the eyeball being colored to represent the pupil of an eye and the socket and eyeball being shaded and contrastingly colored.

2. A toy, lure or the like of wood having a curved surface with a conical socket therein constituting an eye socket and with a spherically curved raised portion within the socket in the same axis and constituting an eyeball, said axis being at an angle to the normal of the said curved surface of the toy or lure.

3. A toy, lure or the like of wood having a curved surface with a conical socket therein disposed with its axial center at an angle to the normal of such curved surface and having a spherically curved raised part within the socket, the center of which is on the axial center of the socket, the recess representing an eye socket and the raised part an eyeball, the eyeball being colored to represent an iris and pupil and both socket and eyeball having a transparent finish coating.

4. A toy, lure or the like of wood having a curved surface with a conical socket therein disposed with its axial center at an angle to the normal of such curved surface and having a spherically curved raised part within the socket, the center of which is on the axial center of the socket, the recess representing an eye socket and the raised part an eyeball.

5. A toy, lure or the like of wood having a conical socket therein constituting an eye socket and with a spherically curved raised portion within the socket constituting an eyeball, the central portion of the eyeball being colored to represent the pupil of an eye and the socket and eye being shaded and contrastingly colored.

6. A toy, lure or the like of wood having a conical socket therein, there being a spherically curved raised part within the socket, the recess representing an eye socket and the raised part an eyeball, the eyeball being colored to represent an iris and pupil and both socket and eyeball having a transparent finish coating.

7. The method of making eyes in wooden toys, fish baits and the like consisting of simultaneously forming with a rotary friction-pressure tool in a curved surface of the object and on a common axis a conical recess representing an eye socket and a curved elevated part at the bottom of the socket representing an eyeball with the axis disposed at an angle to the normal of the curved surface in which they are formed, applying a foundation coating to the surfaces of the socket and eyeball, suitably coloring the eyeball to represent the iris and pupil, and applying a transparent finishing coating.

8. The method of making eyes in wooden toys, fish baits and the like consisting of simultaneously forming in a curved surface of the object and on a common axis a conical recess representing an eye socket and a curved elevated part at the bottom of the socket representing an eyeball with the axis disposed at an angle to the normal of the curved surface in which they are formed, suitably coloring the eyeball, and applying a transparent finishing coating.

9. The method of making eyes in wooden toys, fish baits and the like consisting of simultaneously forming with a rotary friction-pressure tool in a surface of the object a conical recess representing an eye socket and a curved elevated part at the bottom of the socket representing an eyeball, applying a foundation coating to the surfaces of the socket and eyeball, suitably coloring the eyeball to represent the iris and pupil, and applying a transparent finish coating.

10. The method of making eyes in wooden toys, fish baits and the like consisting of simultaneously forming with a rotary friction-pressure tool in a curved surface of the object and on a common axis a conical recess representing an eye socket and a curved elevated part at the bottom of the socket representing an eyeball with the axis disposed at an angle to the normal of the curved surface in which they are formed.

11. The method of making eyes in wooden toys, fish baits and the like consisting of simultaneously forming with a rotary friction-pressure tool in a surface of the object a conical recess representing an eye socket and a curved elevated part at the bottom of the socket representing an eyeball.

GLEN H. WALKER.